July 22, 1969

M. BAERMANN 3,456,374

PERMANENT MAGNET DEVICE FOR MOUNTING A
PHOTOGRAPHIC TRANSPARENCY

Filed March 3, 1967

INVENTOR.
MAX BAERMANN

BY
*Meyer, Tilberry & Body*

ATTORNEYS

July 22, 1969  M. BAERMANN  3,456,374
PERMANENT MAGNET DEVICE FOR MOUNTING A
PHOTOGRAPHIC TRANSPARENCY Filed March 3, 1967  3 Sheets-Sheet 2

INVENTOR.
MAX BAERMANN
BY
Meyer, Tilberry & Body
ATTORNEYS

July 22, 1969  M. BAERMANN  3,456,374
PERMANENT MAGNET DEVICE FOR MOUNTING A
PHOTOGRAPHIC TRANSPARENCY
Filed March 3, 1967  3 Sheets-Sheet 3
FIG. 9
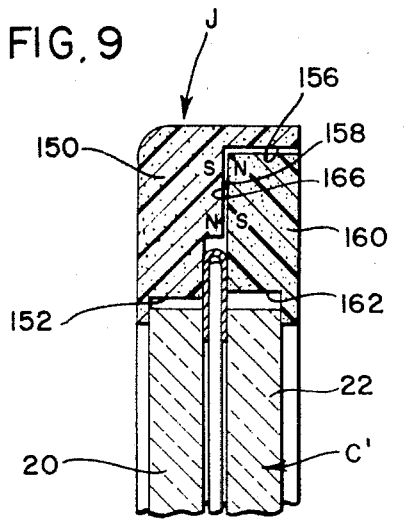
FIG. 10
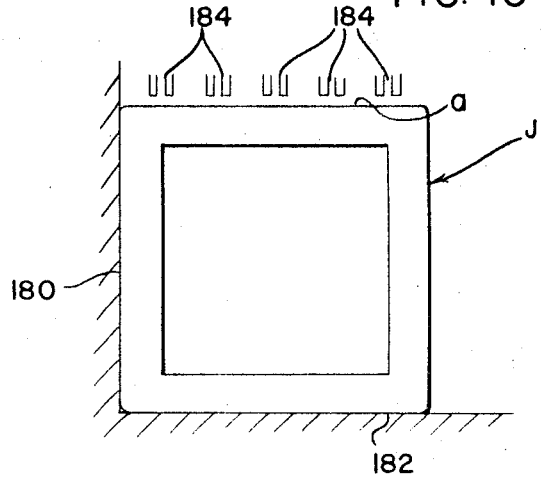
FIG. 12
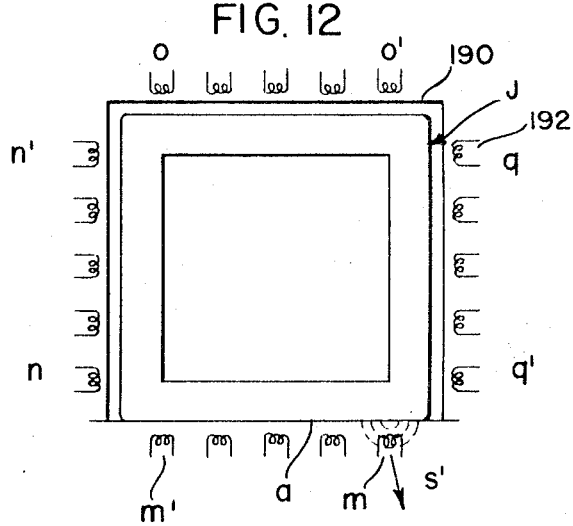
FIG. 11
INVENTOR.
MAX BAERMANN
BY
Meyer, Tilberry & Body
ATTORNEYS United States Patent Office 3,456,374
Patented July 22, 1969

3,456,374
PERMANENT MAGNET DEVICE FOR MOUNTING A PHOTOGRAPHIC TRANSPARENCY
Max Baermann, 506 Bensberg, Bezirk, Cologne, Germany
Filed Mar. 3, 1967, Ser. No. 620,357
Claims priority, application Germany, Mar. 10, 1966,
B 86,128
Int. Cl. G09f 1/12
U.S. Cl. 40—152                2 Claims

ABSTRACT OF THE DISCLOSURE

A device for mounting a photographic transparency which uses permanent magnets to hold two generally rectangular frames together on opposite sides of the transparency.

---

This invention pertains to the art of permanent magnets and, more particularly, to a permanent magnet device for mounting photographic transparencies. A transparency is a single frame portion of a film which is adapted to be placed within an optical projector so that the picture appearing on the film may be projected, as an enlarged image, onto a screen, or similar device.

Many arrangements have been used to mount photographic transparencies so that they may be used in projectors or viewers. The most common of these arrangements includes two cardboard frames which are glued onto the opposite sides of a transparency to leave the picture portion exposed. This arrangement provides relatively little protection for the transparency and causes difficulty in feeding a number of transparencies through an automatic viewer or projector. To overcome these disadvantages, it has become somewhat common practice to mount transparencies in a more rigid device.

The most common of these transparency mounting devices includes two generally rectangular frames having central openings. The frames are mechanically fastened together so that the transparency may be removed if dust particles are entrapped between the frames or if a new transparency is to be substituted within the device. These devices have not proven completely satisfactory because they cannot be tightly closed to prevent the ingress of dust and other particles.

To avoid the difficulty of the mechanically coupled releasable transparency holding devices, it has been suggested that the two frames may be glued together around their outer peripheries. After inserting a transparency between the two frames, the frames are pressed together so that the adhesive seals the frames to prevent ingress to the transparency area. This does prevent foreign matters from entering into the transparency area between the frames; however, if dust happens to be sealed into this type of device, which may occur even though the transparency is carefully cleaned because the film may be charged with static electricity, it is difficult to again separate the frames. In most instances, even if the frames are separated, they cannot be reused. It is also impossible to substitute transparencies within this particular type of holding device.

It is the purpose of the present invention to avoid the disadvantages of prior transparency mounting devices by providing a device which permits a perfect seal against dust while allowing easy reopening and reuse of the device.

In accordance with the invention, two generally rectangular frames are provided with at least one being made of a permanent magnet material or having a permanent magnet provided thereon. The permanent magnet material or a permanent magnet on the first frame magnetically attracts the other frame which is made of either a magnetically permeable material or a permanent magnet material. Thus, magnetic attraction between the two frames releasably holds the frames together to prevent the ingress of dust and other foreign matters while allowing easy disassembling of the two frames.

In accordance with one aspect of the invention, one frame may be made of a rigid plastic material in which permanently magnetizable particles have been imbedded. The other frame is made of a flexible permanent magnet material formed from finely divided, permanently magnetizable particles dispersed throughout a nonmagnetic, flexible matrix. The frame made from a flexible plastic bound permanent magnet material can also be replaced by a frame made of a high permeability material, such as a thin plate or sheet of magnetically conductive material. Such material is, of course, a high permeability material which is attracted to the permanent magnet poles on the other frame member.

In accordance with another aspect of the invention, both frames may be made of plastic material with a strip of permanent magnet material being provided around the peripheries of the frames. In this instance, it is preferable to use a flexible, permanent magnet made from finely divided, permanently magnetizable particles dispersed throughout and bonded within a flexible, plastic matrix. It is conceivable that only one of the frames is provided with such a flexible permanent magnet, and the other frame could then be provided with a high permeability material. If a strip of permanent magnet material is used, the frames onto which the strip is mounted may be provided with a groove extending around the opening of the frames with the cross section of the groove generally corresponding to the cross section of the flexible permanent magnet strips. In this manner, the strips may be inserted within the grooves to provide a generally flat outer surface for the frame. It is also possible that one frame be made of a magnetically non-conductive metal, such as aluminum, in which a rectangular, permanent magnet element is inserted, while the other frame is made of a permanent magnet material, preferably of a flexible material. Also, this other frame could be provided with a high permeability flexible or rigid material.

By using a flexible, permanent magnet material, an especially good seal is achieved between the two frame members so that foreign matters cannot work their way into the space between the frames. This is accomplished because the flexible, permanent magnet material may compensate for any unevenness along the surfaces of the opposite frames. This permanent magnet material is made of a soft plastic or rubber binder into which powdered permanent magnet materials have been imbedded. These permanent magnet materials are generally ceramic materials, such as barium ferrite. The strips formed from flexible, permanent magnet material may be manufactured by extruding or injection molding the flexible mixture into the desired shape. In addition, the flexible, permanent magnet material may be formed into sheets by a rolling mill, after which the permanent magnet elements of the holding device may be stamped from this sheet and magnetized.

To facilitate mounting of the transparencies, translucent protective plates are glued onto the exterior surfaces of a rectangular mask which is provided on opposite sides of the transparency. These protective plates complete the sealing of the transparency from the ingress of a foreign matter.

In accordance with the basic concept of the present invention, there is provided an improvement in a device for mounting a generally rectangular, photographic transparency having a central picture area. This device includes first and second generally rectangular frames with a generally central opening. The frames are adapted to be positioned on opposite sides of the transparency with their openings being aligned with the picture area of the transparency, and means are provided for locating the frames with respect to each other and for holding the frames together. The improvement in this type of structure, in accordance with the invention, includes foming the frame holding means as a permanent magnet portion on one frame and a magnetically attractable portion on the other frame, with the portions being generally aligned and providing a holding force between the frames. Of course, a mask with outer protective plates is first provided on the transparency to coact with the frames and provide a complete seal around all surfaces of the transparency.

The primary object of the present invention is the provision of a device for mounting photographic transparencies, which device includes two frames that seal around the transparency and are easily separable.

Another object of the present invention is the provision of a device for mounting photographic transparencies, which device includes two frames held together by permanent magnets.

There and other objects and advantages will become apparent from the following description used to illustrate the preferred embodiments of the invention as read in connection with the accompanying drawings in which:

FIGURES 3-9 are cross-sectional views illustrating further embodiments of the present invention; and, FIGURES 10-12 are schematic views illustrating another aspect of the present invention.

Figure 1:
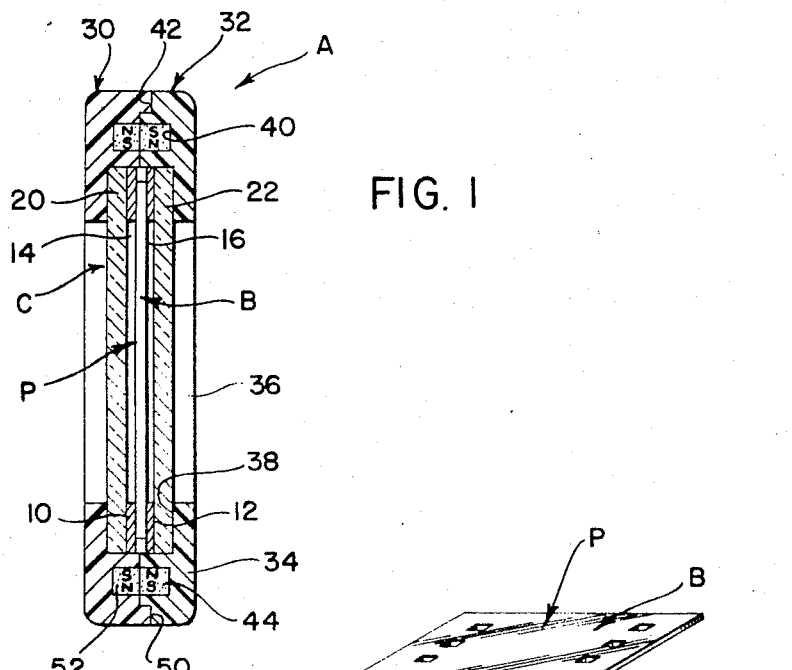
FIGURE 1 is a cross-sectional view illustrating, somewhat schematically, one embodiment of the present invention.
Figure 2:
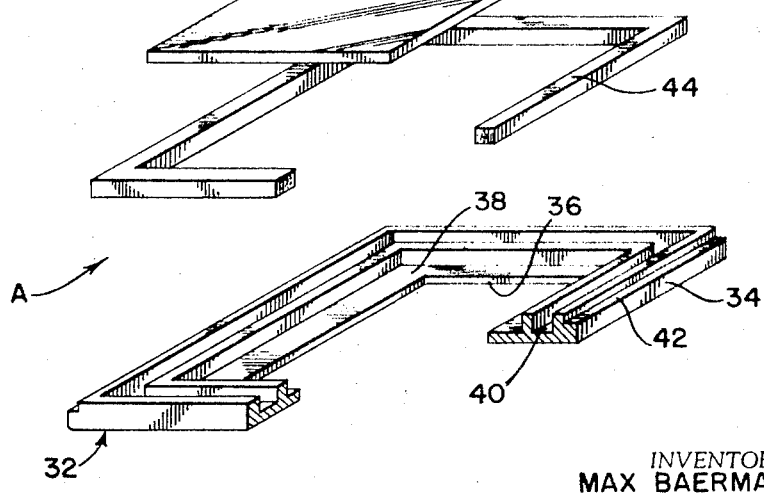
FIGURE 2 is an exploded, partially cross-sectioned, view illustrating one side of the embodiment illustrated in FIGURE 1.

Referring now to the drawings wherein the showings are for the purpose of illustrating preferred embodiments of the invention only and not for the purpose of limiting same, FIGURES 1 and 2 illustrate a device A for mounting a transparency B having a picture area P. The transparency is carried in a sandwich unit C which comprises two rectangular masks 10, 12 for blocking out the marginal portion of the transparency and having openings 14, 16 which expose the area portion P of the transparency. The sandwich C also includes protective plates 20, 22 glued, or otherwise secured, onto the previously mentioned masks. In accordance with this embodiment of the invention, device A includes two frames 30, 32 which are somewhat identical in construction; therefore, only frame 32, which is best illustrated in FIGURE 2, will be described in detail. This description will apply equally to frame 30.

Frame 32 includes a low permeability, non-magnetic, rectangular element 34 that may be formed from various materials, such as plastic or aluminum. This element includes a central opening 36, an inner recess 38, a groove 40, and a recess 42, all of which extend around the periphery of element 34. A generally rectangular permanent magnet 44 is secured in the rectangular groove 40 to provide outwardly extending magnetic poles, as designated. The rectangular permanent magnet may be formed by various processes. Generally, finely divided, permanently magnetizable particles are dispersed throughout and bonded in a flexible, non-magnetic binder. The rectangular configuration of magnet 44 may be produced by injection molding the above-defined mixture; by extruding the mixture into strips, cutting the strips and assembling them into a rectangular configuration; or, by milling the mixture in a calender to form a sheet and stamping the illustrated configuration from this sheet. Each of these processes are well-known in the permanent magnet art.

Referring now to the second frame 30, this frame includes a peripheral rim 50 which is received within recess 42 of frame 32. A rectangular permanent magnet 52, similar to magnet 44 in frame 32, is provided within the peripheral groove of frame 30. As illustrated in FIGURE 1, the magnetic poles on magnet 52 are opposite to the corresponding poles on magnet 44 so that the frames 30, 32 are pulled together by magnetic attraction. The assembly of device A is readily apparent from FIGURES 1 and 2. First, the sandwich unit C is assembled. Thereafter, this unit is placed within recess 38 of one frame, and the other frame is placed thereover. The permanent magnets 44, 52 hold the frames together. Disassembly of the device A is accomplished by reversing the above-mentioned steps. It is readily apparent that the device A may disassembled without destroying any components thereof. This facilitates the substitution of various transparencies within the device at will.

Figure 3:
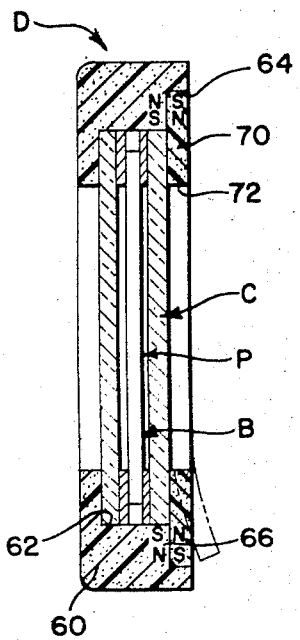

Referring now to FIGURE 3, another embodiment of the present invention is illustrated. Device D includes a first frame 60 formed from a plastic material with finely divided, permanently magnetizable particles imbedded therein. On one side of this frame is formed a recess 62 for receiving sandwich unit C and a recess 64 having a transversely facing magnetized surface 66. The surface 66 may be magnetized by magnetizing the permanently magnetizable particles within the frame 60. The second frame 70 is adapted to be placed within recess 64. This second frame may be formed from one of two materials. First, this frame may be formed from a flexible, permanent magnet material, similar to that used in producing the permanent magnets 44, 52 of device A. Secondly, frame 70 may be formed from a high permeability material, such as a flat sheet of iron or magnetic steel. In either case, an opening 72 is provided within second frame 70 to expose the picture area of transparency B. The assembly and disassembly of device D is apparent from the drawing.

Figure 4:
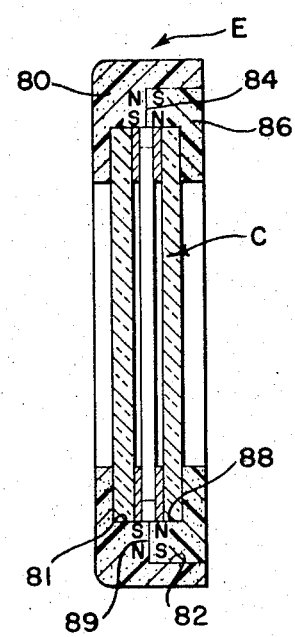

Referring now to FIGURE 4, still a further embodiment of the invention is illustrated. In accordance with this embodiment, a transparency mounting device E is provided with a first frame 80. This frame is formed from a rigid plastic material having imbedded therein finely divided, permanently magnetizable particles. A recess 81 is adapted to receive one-half of sandwich unit C, while a second recess 82 is provided with a magnetized surface 84. Second frame 86, formed from a material similar to that used in frame 80, is provided with a recess 88 for receiving the other half of unit C. Frame 86 includes a magnetized surface 89 which has magnetic poles generally opposite from the poles on surface 84 to create a magnetic holding force between the two frames forming the mounting device.

Figure 5:
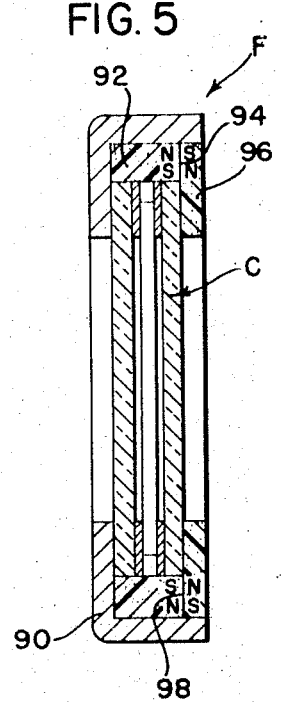

Another embodiment of the present invention is illustrated in FIGURE 5, wherein device F includes a cup-shaped first frame 90 formed from a non-magnetic material, such as aluminum or hardened plastic. A generally rectangular magnetic strip 92 defines a nest for receiving sandwich unit C and includes a magnetized surface 94. A second frame 96, formed from a material similar to frame 70 in device D, is provided with a magnetized surface 98 to magnetically attract the second frame onto the first frame. Of course, magnetic strip 92 must be secured within the cup-shaped frame 90. An adhesive is appropriate for this purpose.

Figure 6:
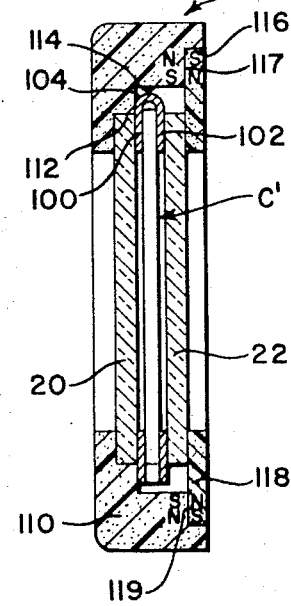

Still another embodiment of the present invention is illustrated in FIGURE 6. Device G utilizes a sandwich C' which is substantially the same as unit C and includes integral masks 100, 102 with an upper hinged portion 104. Onto these masks there are secured transparent or translucent plates 20, 22. A first frame 110 includes a recess 112 for centering the sandwich unit C' with respect to frame 110 by engaging plate 20. A second recess 114 provides clearance around the sandwich unit. A third recess 116 defines a magnetized surface 117 onto which is secured the second frame 118 having a magnetized surface 119. Frame 118 is formed from a material similar to frame 70 in FIGURE 3.

Figure 7:
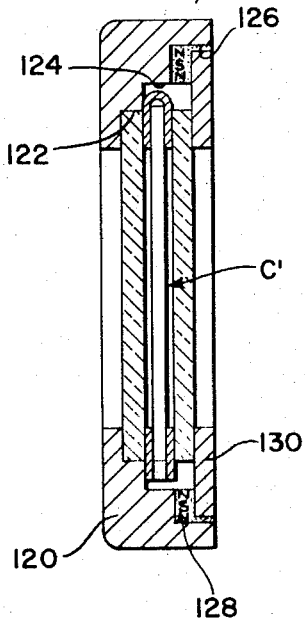

Still another embodiment of the present invention is illustrated in FIGURE 7. Device H is somewhat similar to device G, and it includes a first frame 120 having recesses 122, 124, and 126. The rectangular permanent magnet, similar to magnets 44, 52 in device A, is secured within the recess 126 to provide an outwardly directed permanent magnet surface. A second frame 130 is formed from a high permeability material, such as a sheet of soft iron. This sheet is attracted by permanent magnet 128 to provide a support for the sandwich unit C' within mounting device H.

Figure 8:
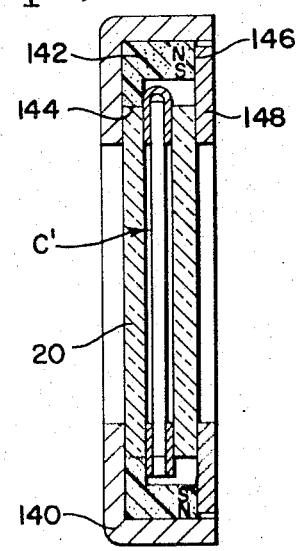

Referring now to FIGURE 8, still a further embodiment of the invention is illustrated. Mounting device I includes a cup-shaped first frame 140 into which is mounted a cup-shaped permanent magnet 142. This magnet may be formed from a rigid plastic material having permanently magnetizable particles dispersed throughout and imbedded within the plastic material. This magnet includes an opening 144 which formes a recess which receives plate 20 of the sandwich unit C'. The permanent magnet has a magnetized surface 146 so that a second frame 148, formed from a high permeability material, may be magnetically attracted thereto.

The last embodiment of the present invention is illustrated in FIGURE 9 wherein device J includes a first frame 150 formed from a hardenable plastic material having permanently magnetizable particles imbedded therein. This frame includes recesses 152, 154, and 156. The latter recess has a magnetized surface 158 directed transversely of the device G. The second frame 160, formed from a material similar to frame 150, is provided with a recess 162 which defines a lip 164 for holding sandwich unit C'. This second frame also includes a magnetized surface 166 facing surface 158 and having opposite magnetic poles thereon. These poles create a magnetic holding force between frames 150, 160.

It is appreciated that various other modifications of the invention could be provided without departing from the intended spirit and scope of the present invention. The numerous illustrated embodiments of the invention are not intended in any way to be limiting of the broad concept of the present invention.

By forming the mounting device for transparencies from a magnetizable material, another advantage is obtained. It is possible to sort, compile, orient, straighten, and classify a series of these mounting devices by a relatively simple procedure. In essence, the exterior surface, or edge, or the parmanent magnet frame may be provided with a predetermined series of magnetized marks which, when the device is passed through an appropriate mechanism, can be sensed to determine various characteristics of each particular mounting device. This can be accomplished without adding any special structural features to the mounting devices previously described. A condenser discharge unit may be brought next to a magnetizable portion of the holding device to impart magnetic holes in a prearranged order to give intelligence to the mounting device. As a marked device passes through a sorting mechanism, scanning heads or sensing elements which are responsive to a magnetic field, can sense the intelligence imparted to the mounting devices. This may be used to orient the mounting devices in a preselected order. Various mechanisms are possible for accomplishing this particular purpose. In addition, this coding of the mounting devices, which may be used to provide magnetic spots or magnetic stripes on the frame of the devices and open various intensity magnetic poles on these devices, can also be used to sort various devices with regard to the subject matter of the transparencies in these devices. In this manner, a great number of transparencies may be stored in a central area and selected transparencies may be removed and oriented by passing the mounting devices through a sensing and sorting device.

FIGURES 10–12 schematically illustrate this particular aspect of the present invention. In FIGURE 10, a mounting device J is moved along surfaces 180, 182 where it may be passed under a plurality of magnetic coding heads. These heads may be controlled by a condenser discharge device, in accordance with known procedures. If the devices J are to be sorted into a particular order, the right hand magnetizing head 184 may be energized as device J passes thereunder. This provides spot poles 186, 188 on the upper surface of the mounting frame surface a as shown in FIGURE 11. If the frame is then passed through a channel 190, having pick-up coils 192 disposed therearound, sorting of the device J is quite easily accomplished. If coils m, n, o, or p are energized by the poles on surface a, it is known that the proper surface of the transparency is properly oriented. On the other hand, if coils m', n', o', or q' are energized, the transparency must be reversed. In a like manner, if coil m is energized, surface a is in the downward position, assumed to be the proper position for the purpose of this discussion. If any other coil picks up the poles 186, 188, the transparency is riding or sliding on the wrong surface. This requires an appropriate mechanism to readjust the disposition of the device J. It is appreciated that one or more magnetic poles could be provided on the outer edge, or on the surface, of device J to provide various intelligence to the device for sorting purposes. This particular aspect of the present invention is schematically illustrated; however, any person in the permanent magnet art could readily develop the standard components for effecting the intended function illustrated and discussed herein.

Having thus defined my invention, I claim:

1. In a device for mounting a generally rectangular photographic transparency having a central picture area, said device including first and second generally rectangular frames with a generally central opening, said frames being adapted to be positioned on opposite sides of said transparency with said openings aligned with said picture area, means for locating said frame with respect to each other, and means for holding said frames together, the improvement comprising: said holding means comprising a permanent magnet portion on one of said frames and a magnetically attractable portion on said other frame, said portions being generally aligned and providing a holding force between said frames, and said permanent magnet portion extending around all four sides of said one frame and comprising an element formed from finely divided, permanently magnetizable particles dispersed throughout and bound within a nonmagnetic matrix.

2. In a device for mounting a generally rectangular photographic transparency having a central picture area, said device including first and second generally rectangular frames with a generally central opening, said frames being adapted to be positioned on opposite sides of said transparency with said openings aligned with said picture area, means for locating said frame with respect to each other, and means for holding said frames together, the improvement comprising: said holding means comprising a permanent magnet portion on one of said frames and a magnetically attractable portion on said other frame, said portions being generally aligned and providing a holding force between said frames, said one frame being formed from a non-magnetic material and said permanent magnet portion being a strip of permanent magnet material extending along at least one side of said one frame, said strip is formed from finely divided, permanently magnetizable particles dispersed throughout and bonded within a non-magnetic matrix.

References Cited

UNITED STATES PATENTS

| | | | |
|---|---|---|---|
| 2,677,910 | 5/1954 | Morgan | 40—158 |
| 2,697,889 | 12/1954 | Heim | 40—152 |
| 2,785,490 | 3/1957 | Fabry | 40—156 |
| 2,959,832 | 11/1960 | Baermann. | |
| 3,150,457 | 3/1964 | Thieme | 40—152 |
| 3,228,133 | 1/1966 | Baermann. | |
| 3,237,327 | 3/1966 | Griggs. | |

EUGENE R. CAPOZIO, Primary Examiner

WENCESLAO J. CONTRERAS, Assistant Examiner